(12) United States Patent
Wilke et al.

(10) Patent No.: US 11,002,583 B2
(45) Date of Patent: May 11, 2021

(54) FLOW MEASUREMENT METHOD AND A FLOW MEASUREMENT DEVICE FOR OPTICAL FLOW MEASUREMENT

(71) Applicant: SIKA Dr. Siebert & Kühn GmbH & Co. KG, Kaufungen (DE)

(72) Inventors: Bastian Wilke, Kassel (DE); Nils Damaschke, Papendorf (DE); Andre Kleinwächter, Stäbelow (DE); Martin Schäper, Rostock (DE)

(73) Assignee: SIKA DR. SIEBERT & KÜHN GMBH & CO. KG, Kaufungen (DE)

( * ) Notice: Subject to any disclaimer, the term of this patent is extended or adjusted under 35 U.S.C. 154(b) by 0 days.

(21) Appl. No.: 16/703,335

(22) Filed: Dec. 4, 2019

(65) Prior Publication Data
US 2020/0182671 A1   Jun. 11, 2020

(30) Foreign Application Priority Data
Dec. 5, 2018   (DE) ...................... 10 2018 131 059.5

(51) Int. Cl.
*G01F 1/708* (2006.01)

(52) U.S. Cl.
CPC .................................. *G01F 1/7086* (2013.01)

(58) Field of Classification Search
CPC ...... G01J 3/2823; G01J 3/0229; G01J 3/0272; G01J 3/10; G01J 3/36; G01J 3/447;
(Continued)

(56) References Cited

U.S. PATENT DOCUMENTS

| 7,738,084 B1 | 6/2010 | Korman et al. |
| 2007/0107512 A1 | 5/2007 | Okazaki |

(Continued)

FOREIGN PATENT DOCUMENTS

| CA | 2439242 A1 | 3/2005 |
| DE | 102005042954 A1 | 3/2007 |

(Continued)

OTHER PUBLICATIONS

Schaeper, M. et al. Particle image velocimetry by using optical spatial filtering method; Proceedings / PIV'11, Ninth International Symposium on Particle Image Velocimetry.

(Continued)

*Primary Examiner* — Michael P Stafira
(74) *Attorney, Agent, or Firm* — Dinsmore & Shohl LLP

(57) ABSTRACT

A flow measurement method for optical measurement of a volume flow of a fluid in a closed cross-section, and a flow measurement device for this purpose, has at least one light source and at least one sensor unit. Particles present in the fluid are detected within a measurement plane by the sensor unit. At least one measurement plane and the particles present therein are illuminated with the light source. The sensor unit is provided with at least two or with a plurality of individual detectors with which sensor signals are outputted. A computing unit is connected downstream of the sensor unit, with which the sensor signals are processed in real time by integrating and weighting the individual signals of the individual detectors using a spatial-filtering technique and outputted as an output signal.

9 Claims, 4 Drawing Sheets

(58) Field of Classification Search
CPC ...... G01J 3/51; G01J 3/513; G01J 2003/2826; G01J 2004/002; G01J 3/0297; G01J 3/28; G01J 3/4406; G01J 4/00; G01J 2003/467; G01J 3/0202; G01J 3/021; G01J 3/0262; G01J 3/0291; G01J 3/46; G01J 3/50; G01J 3/18; G01J 3/44; G01J 3/45; G01J 3/453; G01J 9/02; G01N 21/47; G01N 21/8806; G01N 21/9501; G01N 2201/06113; G01N 2021/4704; G01N 2021/4711; G01N 2021/4735; G01N 2021/6417; G01N 2021/6421; G01N 2021/8822; G01N 2021/8825; G01N 2021/8848; G01N 2021/8887; G01N 21/21; G01N 21/255; G01N 21/27; G01N 21/3563; G01N 21/412; G01N 21/6428; G01N 21/6456; G01N 21/6486; G01N 21/90; G01N 21/94; G01N 21/956; G01N 21/95607; G01N 21/95623; G01N 2201/063; G01N 2201/0636; G01N 2201/068; G01N 2291/021; G01N 2291/02809; G01N 2291/106; G01N 29/024; G01N 29/036; G01N 29/14; G01N 29/222; G01N 29/223; G01N 29/326; G01N 29/42; G01N 29/4472; G01N 29/46; G01N 33/0036; G01N 15/1429; G01N 2021/0181; G01N 21/01; G01N 21/84; G01N 15/1427; G01N 15/1434; G01N 15/1475; G01N 2015/1075; G01N 2015/1087; G01N 2015/144; G01N 2015/1445; G01N 2015/1452; G01N 2015/1472; G01N 2015/1477; G01N 2015/1493; G01N 2015/1497; G01N 2021/0112; G01N 2021/0193; G01N 2021/1765; G01N 2021/458; G01N 2035/00881; G01N 21/9027; G01N 2021/6419; G01N 2021/6441; G01N 2021/845; G01N 2033/245; G01N 21/17; G01N 21/31; G01N 21/51; G01N 21/55; G01N 21/64; G01N 21/8851; G01N 2201/125; G01N 2333/75; G01N 2800/122; G01N 29/02; G01N 33/004; G01N 33/0047; G01N 33/24; G01N 33/4905; G01N 33/5044; G01N 33/5743; G01N 33/582; G01N 33/86; G01N 11/10; G01N 13/00; G01N 15/0205; G01N 2011/008; G01N 2013/0216; G01N 2015/1006; G01N 2021/653; G01N 2021/655; G01N 21/35; G01N 21/45; G01N 21/4788; G01N 21/4795; G01N 21/6458; G01N 2223/419; G01N 23/046; G01N 29/00; G01N 33/5091; G01N 33/574; G01N 15/14; G02B 27/46; G02B 13/001; G02B 13/22; G02B 15/02; G02B 1/045; G02B 1/048; G02B 21/0032; G02B 21/006; G02B 21/16; G02B 21/361; G02B 21/367; G02B 23/20; G02B 27/0025; G02B 27/283; G02B 27/286; G02B 27/425; G02B 27/4255; G02B 27/4261; G02B 27/4272; G02B 27/4277; G02B 6/02228; G02B 6/032; G02B 6/0365; G02B 6/14; G02B 6/264; G02B 6/268; G02B 7/021; G02B 7/04; G02B 27/0172; G02B 2027/0178; G02B 27/017; G02B 27/1006; G02B 2027/0138; G02B 2027/014; G02B 2027/0187; G02B 21/0056; G02B 27/0075; G02B 27/0093; G02B 27/0927; G02B 3/0006; G02B 5/0226; G02B 55/0278; G02B 6/0041; G02B 6/0051; G02B 6/0053; G02B 7/06; G02B 7/09; G02B 27/54; G01B 11/24; G01B 11/306; G01B 11/002; G01B 11/2545; G01B 11/272; G01B 9/02004; G01B 9/0203; G01B 9/02032; G01B 9/02043; G01B 9/02044; G01B 9/02072; G01B 9/02077; G01B 9/02085; G01B 9/02091; G01B 9/02097; G01B 11/14; G01B 11/026; G01B 11/26; G01B 15/00; G01B 9/0205; G01F 1/10; G01F 1/7086; G01F 1/663; G01F 1/661; G01F 1/712; G01F 1/002; G01F 1/86; G01F 15/08; G01F 1/66; G01F 1/74; G01F 7/005

See application file for complete search history.

(56) References Cited

U.S. PATENT DOCUMENTS

| | | | |
|---|---|---|---|
| 2010/0235117 | A1* | 9/2010 | Melnyk ................. G01P 5/26 702/49 |
| 2012/0078531 | A1* | 3/2012 | Lo ..................... G01N 15/1425 702/21 |
| 2013/0242301 | A1* | 9/2013 | Berg .................. G01N 15/1475 356/336 |
| 2015/0260560 | A1 | 9/2015 | Quin et al. |
| 2017/0059485 | A1* | 3/2017 | Yamamoto ........... G01N 33/582 |
| 2017/0227466 | A1* | 8/2017 | Lo ..................... G01N 15/1434 |
| 2017/0307580 | A1 | 10/2017 | Kim et al. |
| 2019/0200657 | A1* | 7/2019 | Hashidate ............. G01N 21/85 |

FOREIGN PATENT DOCUMENTS

| | | |
|---|---|---|
| DE | 102006039489 B3 | 1/2008 |
| DE | 102007040970 B3 | 4/2009 |
| DE | 102009005800 A1 | 7/2010 |
| DE | 102010030835 A1 | 1/2012 |
| DE | 102014205882 B3 | 8/2015 |
| DE | 102015001826 B3 | 3/2016 |
| DE | 102015217022 A1 | 3/2017 |
| EP | 3388866 A1 | 10/2018 |
| JP | 2016-182842 * | 9/2016 |

OTHER PUBLICATIONS

Schaeper, M. et al. Pre-processing for Multidimensional Spatial Filtering Technique; 6th Int Symp on Applications of Laser Techniques to Fluid Mechanics Lisbon, Portugal, Jul. 9-12, 2012.

Hosokawa, S. et al. Tomographic spatial filter velocimetry for three-dimensional measurement of fluid velocity; Exp Fluids (2013) 54:1597.

Schaeper, M. "Mehrdimensionale Ortsfiltertechnik" Chapter 4, pp. 59-89, Springer Vieweg, Springer Fachmedien, Wiesbaden, Germany, 2014.

Steinmetz, T. et al. "Accuracy of Time-Resolved Velocity Estimation by Adaptive Spatial Filter Velocimetry in Comparison to PIV Cross Correlation" 19th International Symposium on the Application of Laser and Imaging Techniques to Fluid Mechanics; Jul. 19, 2018; pp. 1720-1731.

C. W. H. Van Doorne et. al. Exp Fluids (2007) 42:259-279; Measurement of laminar, transitional and turbulent pipe flow using Stereoscopic-PIV.

Leo Hugo Oskar Hellstrom, Princeton University, Thesis, Jun. 2015; Coherent structures in turbulent pipe flow.

* cited by examiner

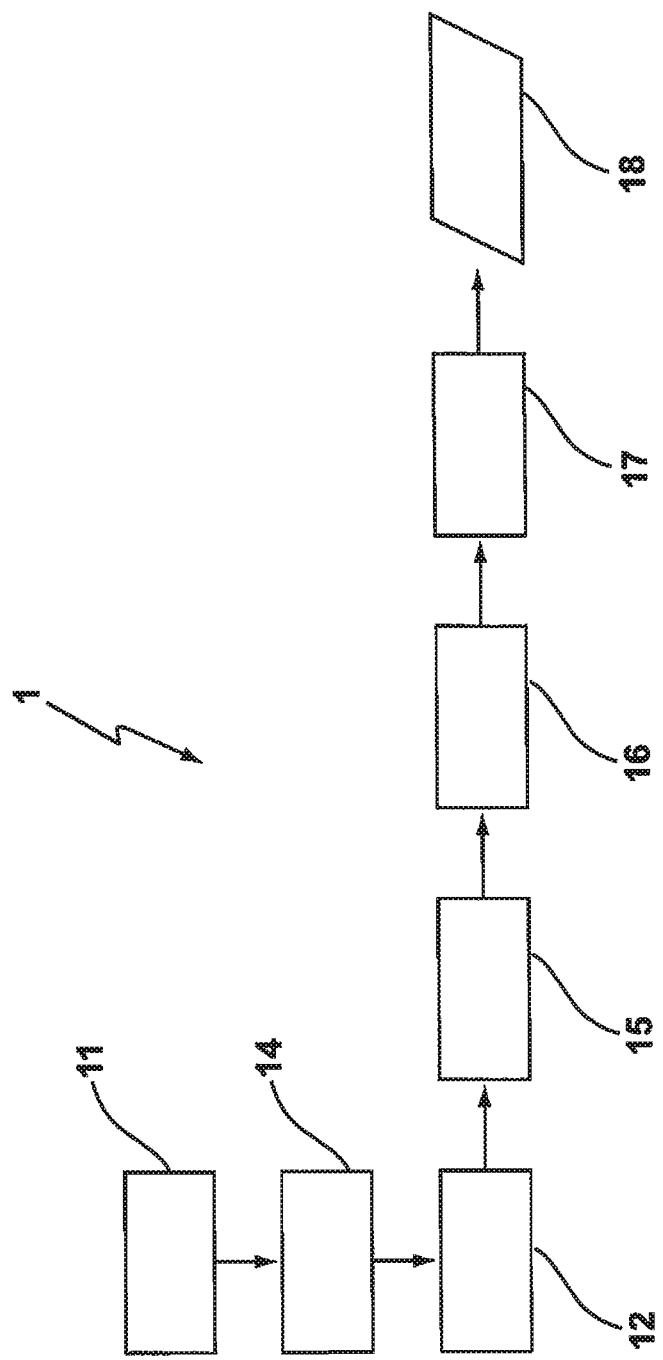

FLOW MEASUREMENT METHOD AND A FLOW MEASUREMENT DEVICE FOR OPTICAL FLOW MEASUREMENT

CROSS-REFERENCE TO RELATED APPLICATIONS

This application claims priority from German Application No. 10 2018 131 059.5 filed Dec. 5, 2018, the entire content of which is incorporated herein by reference.

FIELD OF THE INVENTION

The invention relates to a flow measurement method for optical measurement of a volumetric flow rate of a fluid in a closed cross-section and a flow measurement device to that end, with at least one light source and at least one sensor unit with which particles present in the fluid are captured within a measurement plane.

BACKGROUND OF THE INVENTION

Many flow measurement methods are invasive measurement methods, which affect the flow and thus for example induce potential measurement errors. On the other hand, there are non-invasive methods, which are based on different operating principles.

With non-invasive methods for flow measurement, the flow of the fluid in the pipe section is not disturbed, in the way it is when using measurement sensors in the flow, so that non-invasive measurement methods should be preferred in principle. In non-invasive methods for measurement of the flow velocity of a fluid, there is no mechanical interaction or coupling with the fluid, but the measuring effort can be significantly greater than in the case of a flow measurement by means of a mechanical interaction with a measurement sensor, for example, that protrudes into the flowing fluid.

Current process-suited methods for measuring the flow rate and volumetric flow rate are based on different operating principles. Acoustic methods can be used without modifying the pipe, but they only provide an integral value. Coriolis flow measuring methods determine the integral mass flow. Magnetic inductive methods require a conductible fluid. A process-suited optical sensor principle for determining the flow rate or the volumetric flow rate is currently not realized and is not known from the literature. Flow rate and volumetric flow rate measurements by means of a flow profile in a pipe require a continuous, time-resolved and real-time capable measurement of said flow profile. The currently known optical flow measurement techniques for determining the volumetric flow rate do not allow for a real-time continuous time-resolved determination of the flow profile in a pipe section with a comparably low hardware expense.

Optical methods for flow measurement, for example also within a pipe section, are based on the irradiation of the fluid with electromagnetic waves, in particular light, for example while it flows through the pipe section. In principle, three methods can be distinguished: punctual measurement methods, integral measurement methods and spatially-resolved measurement methods.

One example of a punctual measurement method is the laser Doppler technique. With this technique only a locally highly limited area can be measured and the resulting small measurement area leads only to an imprecise indication regarding the entire volumetric flow rate of the fluid. This concerns in particular flows with distinctive or even dynamically variable flow profiles. Volumetric flow measurements using the laser Doppler technique are typically used for stationary flows by scanning the profile.

The laser Doppler technique was expanded in DE 10 2005 042 954 A1 to include spatially-resolved determination of flow profiles. However, the profile sensor described therein requires high expenses to realize, adjust and couple the superimposed diverging interference band structures. It further requires carrying out an optical and/or mechanical adaptation of the interference structure to the process. In addition, the laser Doppler technique always requires coherent light and thus a laser beam source. Furthermore, the sensor cannot measure directly through curved surfaces, since this disrupts the interference pattern.

An integral method is implemented by means of the optical runtime or correlation flowmeter, which is known for example from CA 2 439 242 A1. This method integrates the signal across the entire flow profile. The conversion to a volumetric flow rate requires a complex model assumption for the flow profile. Velocity-related or installation-related flow profile changes disadvantageously reduce the measurement accuracy and/or the dynamic range.

A known optical measurement method for determining the spatially-resolved flow velocity of a fluid is the so-called particle image velocimetry. This method determines the local two-dimensional displacement of imaged particles present in the flow. The estimation of the displacement is based either on cross-correlation (particle image velocimetry, PIV) or a tracking of image characteristics (particle tracking velocimetry, PTV). Because of the very high computing power required for analyzing the image data and determining the local velocity vectors, a continuous real-time measurement of the flow velocity of a fluid is not easy to implement. The required measurement technology, in particular the hardware for providing high computing power, is very costly.

In addition, particle image velocimetry requires a uniform focusing of the image. In the case of volumetric flow rate measurements in round pipes, for example, and/or of oblique observation directions, there is no sufficient homogeneity of the focus and the imaging quality changes locally. In order to provide a homogeneous imaging quality with oblique observation directions, particle image velocimetry utilizes so-called Scheimpflug devices. These devices have a rather complex opto-mechanical construction and are not suited for all image sensors, because of microlens arrays. In addition, particle image velocimetry requires an image calibration. Continuous time-resolved real-time volumetric flow rate measurements by means of particle image velocimetry are not known in the scientific literature nor in the commercial sector.

Another optical method for determining movements is the imaging spatial filtering technique. Typically, the spatial filtering technique is used as a punctual technique for determining the 1 component punctual velocity of surfaces. The spatial filter signal results from the overlap of many individual scattering signals.

There are a few scientific papers that deal with the use of the spatial filtering technique for determining spatial-resolved flow velocities. The spatial filter technique is used, for example, for a spatially-resolved measurement of a flow velocity field in Schaeper M, Damaschke N, Kühn V, Pöggel S (2011); "Partical image velocimetry by using optical spatial filtering method PIV' 11", Ninth International Symposium on Particle Image Velocimetry, Kobe, Japan. The advantage of the imaging spatial filtering technique as opposed to particle image velocimetry is the highly reduced calculation effort for determining the local image displacement. In Steinmetz T, Schaeper M, Kostbade R, Damaschke N, (2018) "Accuracy of Time-Resolved Velocity Estimation by Adaptive Spatial Filter Velocimetry in Comparison to PIV Cross Correlation" 19th International Symposium on the Application of Laser and Imaging Techniques to Fluid Mechanics, Lisbon, Portugal, it was shown that the spatial filtering technique allows achieving accuracies that are similar to those obtained with particle image velocimetry. Otherwise this technique has the same disadvantages as particle image velocimetry.

The spatial filtering technique is also used for velocity determination in capillaries. In DE 10 2010 030 835 A1 a system is described for determining the one-component velocity along one-dimensional paths, for example along blood capillaries. This method is an integral method, which determines a velocity information of the flow direction.

The spatial filtering technique is also used in Bergeler S, Krambeer H (2004), "Novel optical spatial filtering methods based on two-dimensional photodetector arrays", Meas Sci Technol 15:1309, as well as in Menn (2010); "Optische Messung der Fließgeschwindigkeit von Erythrozyten zur Erfassung der Mikrozirkulation" (Optical Measurement of the Flow Velocity of Erythrocytes for Capturing the Microcirculation"), Fakultät für Maschinenbau, University of Rostock, for determining an integrated 1-component flow profile in a glass capillary. Because of the volumetric illumination and the thus existing integration in the observation direction, it is not possible to determine a purely one-dimensional flow profile, but only velocity average values across a depth rang. Also, a time-resolved analysis of the spatial filter signal is no longer possible because of the temporal integration and the overlap of many scattered light signals. In this respect, this method is also a spatially and temporally integrating method, which provides an average value profile of a stationary flow. The volumetric illumination was also necessary for producing the homogeneous imaging characteristics.

Because of the volumetric illumination and the thereby included depth integration, it is necessary to make model assumptions for the flow profile, in order to obtain a quantitative flow rate measurement. Accordingly, Bergeler and Krambeer (2004) as well as Menn (2010) only make qualitative statements about the measured form of the flow profile and a quantitative scaling regarding the theoretical curve. As a whole, such a method is not real-time capable and does not have a sufficient temporal resolution and is furthermore limited to known flow profiles. In addition, the method requires very high concentrations of scattered particles and large scattered light particles and cannot capture local transverse components in the flow, which are formed for example in the case of turbulences or for example in the case of swirls of the fluid in a flow cross-section.

SUMMARY OF THE INVENTION

The problem underlying the invention is to further improve a flow measurement device for measuring the volumetric flow rate and the flow velocity of a fluid flowing inside a closed cross-section by means of a continuous time-resolved identification of the flow profile and the creation of a corresponding method, wherein the flow measurement device is to utilize an optical measurement method and wherein output signals of the flow measurements are to be outputted in real-time.

This problem is solved based on a flow measurement method as disclosed herein and based on a device as disclosed herein with their respective characteristic features. Advantageous developments of the invention are also disclosed.

The invention includes the technical teaching that at least one measurement plane and the particle contained therein are illuminated with the light source, wherein the sensor unit is provided with at least two or with a plurality of individual detectors, with which sensor signals are outputted, and wherein a computing unit is connected downstream of the sensor unit, by means of which the sensor signals are processed in real-time by integrating and weighting the individual signals of the individual detectors using the spatial-filtering technique and outputted as output signals.

The core idea of the invention is operating two or several individual detectors that form the sensor unit, and that the sensor signals can be processed in real-time by the computing unit by integrating and weighting the individual signals of the individual detectors by using the spatial-filtering technique and outputted as output signals. Thereby an output signal can be outputted in real time, thus allowing for a very precise observation of the flow by means of an optical measurement method in a pipe cross-section.

In order to implement this measurement technique for an optical determination of the volumetric flow rate, the flow profile is expediently captured in a measurement area in a temporally and spatially resolved manner. The measurement area is a measurement plane in the flow inside the pipe and is illuminated by means of a light source, e.g. a laser or LED. Particles, e.g. bubbles, solid matter, drops, organic particles, which move with the flow in the measurement plane, scatter the light, which is captured by a detector unit consisting of an imaging optical system and an array detector.

Another essential aspect of the invention is the arrangement of a field programmable gate array between the sensor unit and the computing unit, which is operated using a program configuration, by means of which image points and/or image lines captured by the sensor unit based on the moved particles serve to generate local motion vectors of the fluid, wherein the spatial-filtering technique directly generates the velocity information. Thus, motion vectors are no longer assigned to the individual particles.

Field programmable gate arrays are known as so-called FPGAs and comprise an integrated circuit (IC) into which a logic circuit can be loaded. Thus, the FPGA can be configured so that data outputted by the sensor unit is processed in real time and can be provided, in real time, meaning with a defined time lag, and continuously as processed information or data, to a downstream computing unit.

The main advantage lies in the coupling of at least one sensor unit for optical flow measurement with an FPGA as a sensor between the sensor unit and a downstream computing unit. Thus, a real-time capability in providing the output signal of the flow measurement device is achieved and a corresponding method can be implemented, by which it is possible, using the flow measurement device, to output output signals of the device in real time with simple means based on the use of an FPGA between the sensor unit and the computing unit.

With low particle concentrations or very small particles in only slightly polluted fluids, e.g. tap water, the performance of the scattered light is very low. According to the invention, the detector unit is therefore positioned under scattered light areas that have a higher scattered light performance, preferably forward scattering, backward scattering or other angular scattering positions.

Another advantage of this non-perpendicular observation of the measurement plane is that the detector array captures the entire flow cross-section in the measurement plane, even with curved, and especially circular pipe cross-sections. By using a weighted integration across the entire flow profile, it is also possible to determine volumetric flow rates of flows with asymmetrical and/or not fully developed flow profiles.

In particular, it is possible to couple an FPGA with several sensors, so that not only one, but also several measurement planes can be analyzed in order to obtain a very precise detection of the flow velocity of a fluid, for example in a pipe cross-section, in which the fluid does not have a stationary flow in the flow direction. In particular, it is provided, according to the invention, that the FPGA has a program configuration, by means of which image points and/or image lines captured by the sensor unit based on the moved particles serve to generate one or several motion vectors of the fluid. In particular, the program configuration can be designed to convert multidimensional movements of the particles and output them as a one-dimensional output signal by means of the FPGA. By using only one FPGA, in particular in conjunction with several sensors, fluid motions can be captured in the direction of flow and transversely to the direction of flow, and analyzed, for example when turbulences or swirls are present in the flow of the fluid.

An output module is connected downstream of the computing unit, to which the motion vectors of the fluid can be outputted by the computing unit and by which a flow velocity of the fluid is specified as an output signal, based on the motion vectors.

In the context of the invention, it is more specifically provided that the sensor unit comprises at least one CMOS sensor. Alternately, there is also the possibility of providing the sensor unit with an arrangement of photodiodes and/or at least one cylindrical lens array line sensor arrangement, wherein at least one CCD sensor can also be provided for forming the sensor unit. Using an adequate optical system, the laminar measurement plane can be imaged with the CMOS sensor, so that movements of the particles in a first direction and in a second direction perpendicular to the first direction can be captured. In the process, the capture takes place in particular based on the spatial filtering technique, wherein movements of the fluid transverse to the direction of flow are captured and converted by means of the FPGA into the velocity component in the direction of flow.

The measurement plane is formed within the flow volume, wherein a first sensor unit is assigned to a first measurement plane and a second sensor unit is assigned to a second measurement plane, wherein the measurement planes are disposed in succession in the direction of flow of the fluid, wherein a successive arrangement is not mandatory, but advantageous. By arranging several measurement planes, the accuracy of the flow measurement can be improved further and the measurement planes can be more specifically arranged with a known angular offset, for example of 60° to 180° and preferably 90°. It is also advantageous if the measurement planes have an angle between 20° and 50° and in particular 30° relative to the normal of the sensor units. It can also be advantageous if the angle of the measurement planes relative to the normal of the associated sensor unit is 45°.

The direction of observation of the sensor unit is thus particularly advantageously set up with an angular offset relative to the direction of emission of a light of a light source, wherein, for example, the angular offset amounts, as described above, to 20° to 50° and in particular 30° in a forward or backward scattering. A particularly high scattered light intensity can thus be utilized, wherein the measurement accuracy is further improved.

Yet another advantage is achieved if several light sources are disposed in such a manner relative to each other and to the sensor unit, that several measurement planes can be captured by one sensor unit. For example, two measurement planes that are perpendicular to each other can be formed. In particular, at least two light sources can be disposed in such a manner relative to each other and to the sensor unit, that at least two measurement planes with a common intersection line, or that are arranged in succession, are formed and captured by only one sensor unit.

The one sensor unit is arranged for example diametrically opposite to the two measurement planes that are created by the corresponding arrangement of the light sources, so that the scattered light is also captured as a back light in an observation direction that lies in the angle bisector between the two light sources. In this respect, the light sources can for example emit light with different wavelengths, or the light sources are operated in a pulsed mode and the light pulses are for example alternately generated by the light sources. Thus, a first measurement plane as a well as a second measurement plane can be captured by means of the sensor unit, in particular designed as a CMOS sensor.

In particular, two measurement planes can also be formed in such a manner that they are captured on different areas of the sensor. For example, two or more parallel measurement planes can be imaged with one sensor, so that the images don't overlap.

The invention furthermore relates to a method for measuring the flow of the fluid by means of the flow measurement device described above.

In particular, the invention further relates to a flow measurement device, which comprises a pipe section through which a fluid can flow, and which comprises at least one light source with which light can be radiated into the pipe cross-section and with which the particles present in the fluid can be illuminated in at least one measurement plane, wherein at least one sensor unit is provided with which the particles present in the fluid can be captured within a measurement plane, and wherein the sensor unit comprises at least two or a plurality of individual detectors with which sensor signals can be outputted, and wherein a computing unit is connected downstream of the sensor unit, by means of which the sensor signals can be processed in real-time by integrating and weighting the individual signals of the individual detectors using the spatial-filtering technique and outputted as output signals.

In addition, according to an advantageous embodiment, a field programmable gate array is arranged between the sensor unit and the computing unit, which is operated using a program configuration, by means of which image points and/or image lines captured by the sensor unit based on the moved particles can serve to generate local motion vectors of the fluid.

In addition, it is advantageous that when processing the data of the sensor unit(s) by means of the FPGA, multidimensional movements of the particles along the direction of flow and transversely to the direction of flow are converted into a flow velocity of the fluid and outputted. In particular it is provided that the at last one light source outputs continuous or pulsed light and/or that the at least one light source outputs light with differing wavelengths.

With the flow measurement device according to the invention and in particular with the method according to the invention, the flow velocity of a fluid can be determined, for example when it flows through a pipe section or through a channel with a closed cross-section, and the spatialfiltering technique can be used. The advantage lies in the capture of local velocity vectors within the flow of the fluid, in order to be able to determine not only a one-dimensional flow by means of the FPGA and the downstream computing unit, but one or several flow profiles in the direction of the cross-section. Most fluids have a sufficient number of particles that are carried along with the flow of the fluid, so that an optical flow measurement can be carried out.

This is realized in particular by forming several measurement planes, in particular several measurement planes within the flow volume, which form an angle or are offset relative to each other. In particular because of the two-dimensionality of the sensor unit, which is preferably designed as a CMOS sensor, several light sections can be formed and the sensor units can be assigned to discrete light sources that have or emit different wavelengths or different pulse sequences or are formed on different areas of the sensor. In particular, the light sources can emit lights of different colors or at intervals, which are correspondingly captured with the sensor units. Thus, measurement planes that are disposed so that they are spatially separated from one another, can also be captured with only one sensor unit. As a result, a real-time capture and identification of asymmetrical flow profiles within a flow cross-section, for example within a pipe section, becomes possible. Such a method based on the spatial filtering technique is also suited for measuring fluids with a very low particle density.

In particular, this results in the advantage that by using the optical spatial filtering technique, the direction of observation relative to the light injection direction can be chosen in such a manner that an optimal intensity of the particle imaging is achieved, due to the improved scattered light performance, without being forced to use an optical prism or a Scheimpflug adapter or refractive index matching, in particular in the case of a forward or backward dispersion with an angular offset of 20° to 50°. In particular by setting an angle of 30° it is possible to capture several measurement planes from different angles with only one sensor unit, thus allowing for a cost-effective implementation of the flow measurement device with two light sources and only one sensor unit.

If pulsed light is used, in particular instead of a constant illumination, a higher lighting performance of the light source or light sources is achieved and there is less motion blur. In addition, several planes of observation can be achieved as well as an improved signal-to-noise ratio in the sensor unit due to the reduction of scattered light and of thermal noise.

The flow measurement device according to the invention allows in particular also for the detection of the degree of contamination, or rather the signal quality of individual CMOS sensors for forming the sensor unit. The advantage lies in particular in the detection and thus the reduction of a process drift and in that a detection of a contamination in the fluid can be carried out and, in particular, maintenance messages can be outputted, for example for an anticipatory maintenance of a fluidic system.

The method does not require an optical calibration, since, in straight pipe sections, there is no distortion along the main flow direction in the area of the measurement plane such as caused by curved surfaces. With the typically known pipe cross-sections and because of the reproduction of the entire pipe cross-section on the detector array, the reproduction scale can be simply determined based on the image data.

The measurement plane is imaged on the detector array by means of an optical system, wherein the optical system does not have to provide any additional sharpness correction, e.g. a typical Scheimpflug configuration, or distortion, in accordance with the invention. In case of an observation at an oblique angle, the imaging parameters, e.g. the focus, in the image can be inhomogeneous. Based on the invention, this does not have any impact on the determination of the flow profile. When the fluid moves, the particles, which are carried along and illuminated, move with the fluid along the flow lines. Due to the oblique observation, the moving particle images on the detector array are defocused to a varying degree. In this respect, the detector array can be realized as a matrix sensor, e.g. a planar CCD, CMOS or smart pixel sensor, but also as a photodiode array.

According to the invention, the values of the detector array are multiplied by one or several weighting functions and integrated or summed across portions of the detector array, preferably along the flow lines. This makes it possible to determine measurement values that are proportional to the velocity and that are representative of the selected portions of the flow, in spite of the inhomogeneous defocusing.

The advantage of this method is that only two operations per element of the array detector, i.e. a constant weighting and a summation, are necessary to determine the velocity. Only in this way a sufficient temporal resolution and real-time capability of the method becomes possible, as comparted to other techniques (PIV).

These operations, namely weighting and integration/summation, can be purposively carried out optically, electronically or computationally. An optical or electronic weighting and/or integration require hardware modifications or specific optical systems and sensors, whereas the computational weighting and summation becomes possible with downstream real-time capable analysis hardware or computing unit.

The computational implementation further has the advantage of dynamically adapting the selected portions and the weighting to the process or the momentary process state. The portions would advantageously lie in the main direction of flow, so that each portion generates a local flow profile measurement value. In case of a large dynamic range of the flow, e.g. from laminar to highly turbulent, in case of temporally highly dynamic volume flow changes, or in case of not completely formed flow profiles, the portions and the weighting functions can be modified, adapted or changed in numbers, for example in order to capture transverse components in the flow profile or back flows. The advantage thereof is that the dynamic of the volumetric flow measurement has several orders of magnitude.

The invention includes a specialized computing unit for real-time capable and time-resolved processing of the input data of the array detectors, in particular a field programmable gate array (FPGA). The computing unit receives the data of the array detector and implements the weighting function or weighting functions, the summation across the portions, the conversion into velocity values as well as the calculation of the volumetric flow rate and the flow rate. Depending on how the method is implemented, the weighting and/or summation can take place optically or electronically, and/or the determination of the velocity and calculation of the volumetric flow rate can take place downstream of the computing unit in separate controller.

BRIEF DESCRIPTION OF THE SEVERAL VIEWS OF THE DRAWING

In the following, additional measures for improving the invention are described in more detail together with the description of preferred exemplary embodiments of the invention, based on the figures. In the drawings:

FIG. 1 shows a schematic view of the components of the flow measurement device,

DETAILED DESCRIPTION OF THE INVENTION

Figure 2A:
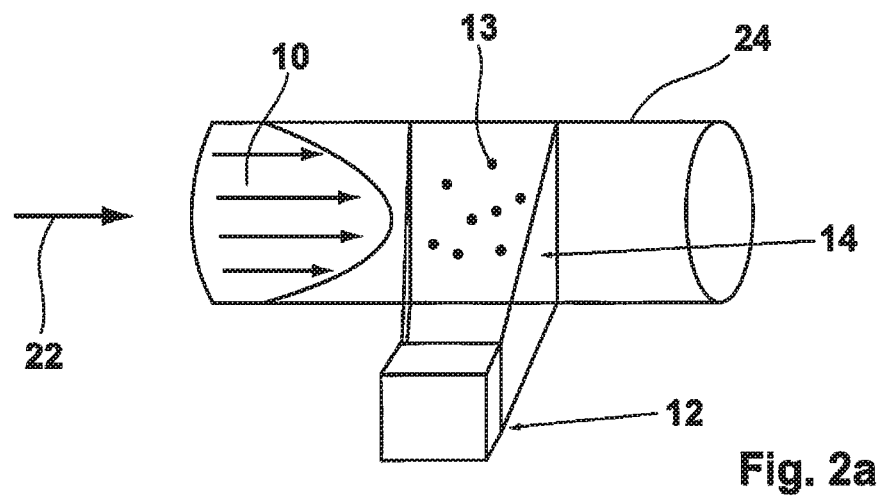
FIG. 2a shows a schematic view of a pipe section with a single measurement plane and a sensor unit associated with the measurement plane.

FIG. 1 shows, in a schematic view, the components of a flow measurement device 1 according to the invention. At least one light source 11 irradiates a least one measurement plane 14, or the plane of the light of the light source 11 within the fluid forms at least one associated measurement plane 14. In addition, a sensor unit 12 is schematically shown, which serves to observe the measurement plane 14, or rather the light radiated by the light source 11 and a field programmable gate array 15 is connected downstream of the sensor unit 12.

Such field programmable gate arrays 15 are also generally referred to as FPGAs 15 and the FPGA represented herein supplies a processed information to a computing unit 16. The computing unit 16 is configured to provide output signals to an output module 17, which eventually outputs velocity information of the fluid as an output signal 18. The computing unit 16 may be a CPU, personal computer, or a processor etc. The output module 17 may be a computer display, LCD screen, a CRT etc.

The at least one light source 11 is designed for example as a laser light source, wherein light-emitting diodes (LEDs) can also be used for the present measurement method. In principle, using coherent light is not necessary to implement the spatial-filtering technique with the flow measurement device 1 according to the invention, so that a light-emitting diode can also serve as a light source 11.

The light source 11 emits either continuous light or pulsed light and it is conceivable that the light source 11 or several light sources 11 can emit different wavelengths.

The measurement planes 14 form measurement planes within the flow volume and one sensor unit 12 is associated with each measurement plane, wherein one sensor unit 12 can also sense several measurement planes 14. In particular two measurement planes 14 can be provided within the flow volume, said planes being successively disposed in the direction of flow of the fluid and forming light sections that are rotated relative to one another, for example by 90°. In this respect, a respective rotation also comprises the arrangement of two sensor units 12, which are associated to each of the measurement planes 14.

The sensor unit 12 or sensor units 12 are formed in particular by CMOS sensors, wherein it is also possible to correspondingly arrange two photodiodes, for example, preferably in conjunction with a diffraction grating that is arranged upstream of the sensor unit 12. It is also possible to provide a cylinder lens array line sensor arrangement for forming sensor units 12, whereby the flow measurement device 1 can be constructed cost-effectively.

The FPGA 15 on the sensor unit 12 shown in the following comprise a program configuration by means of which image points and/or image lines captured by the sensor unit 12 based on the moved particles in the fluid serve to generate local motion vectors of the particle and thus of the fluid. In this respect, the generation of the motion vectors takes place in real-time and the corresponding information is output to a downstream computing unit 16. Ultimately, the output signal 18 can be outputted with the computing unit 16 by way of the output module 17.

A particular advantage of the use of the FPGA 15 is that movements of the fluid are detected transversely to the main direction of flow of the fluid and converted into 2D information, so that a comparative value is eventually created, with which a corresponding velocity vector is formed, as resulting final vector information, across the entire flow cross-section, wherein the flow can also comprise rotating parts or swirls around the longitudinal axis of the direction of flow. In this respect, the conversion takes place in the FPGA 15 and can be outputted to the computing unit 16 as simple vector information.

FIG. 2a shows a first example of a pipe cross-section 24 through which a fluid 10 flows in a direction of flow 22. As an example, a single measurement plane 14 is shown, which forms a measurement plane, wherein the main direction of flow 22 lies in the measurement plane. In this respect, the measurement plane 14 is formed by a light source (not shown) for radiating light from the outside into the flow volume in the pipe section 24. To this end, the pipe section 24 comprises for example a wall area that is transparent to light.

In the fluid 10, there are particles 13, which are captured by the sensor unit 12 within the measurement plane 14. In this respect, the detection of the movement of the particles 13 takes place both in the direction of flow 22 and transversely to the direction of flow 22 within the measurement plane 14.

Figure 2B:
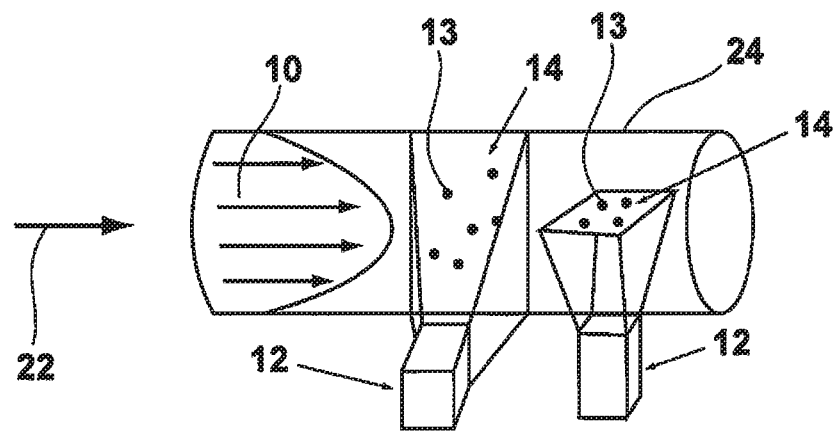
FIG. 2b shows a schematic view of a pipe section with a first measurement plane, with a second pipe section and with two sensor units associated with the respective measurement planes.

FIG. 2b shows a view of the pipe section 24 through which a fluid 10 flows in the direction of flow 22, and the arrangement comprises a first measurement plane 14 and a downstream second measurement plane 14, wherein a first sensor unit 12 is associated with the first measurement plane 14 and a second sensor unit 12 is associated with the second measurement plane 14. The measurement planes 14 are disposed with an angular offset of 90° relative to one another, wherein the flow direction 22 lies, as a vector, in each measurement plane 14.

When the movements of the particles 13 in the measurement planes 14 is captured, rotations and swirls, in particular an angular momentum, can be recognized in the fluid 10, wherein the information from both sensor units 12 are transmitted to the FPGA 15 (see FIG. 1). This makes it possible, in particular, to determine a plurality of local velocity vectors, in order to be able to reconstruct one or several 1D-2C flow profiles or even, ideally, a 2D 3C flow profile in the cross-sectional direction. This is only made possible by the arrangement of two successively disposed measurement planes 14, wherein the measurement planes 14 can also be located within one another. In particular, the sensor unit 12 can be designed two-dimensionally or several light sections can be provided, which have different wavelengths that are temporally staggered, in particular pulsed or spatially separated. The particular advantage thereof is that unsymmetrical flow profiles can be measured, so that the movement vectors of the particles 13 can be processed with the downstream FPGA 15 into velocity information of the fluid 10 in the pipe cross-section 24.

Figure 3:
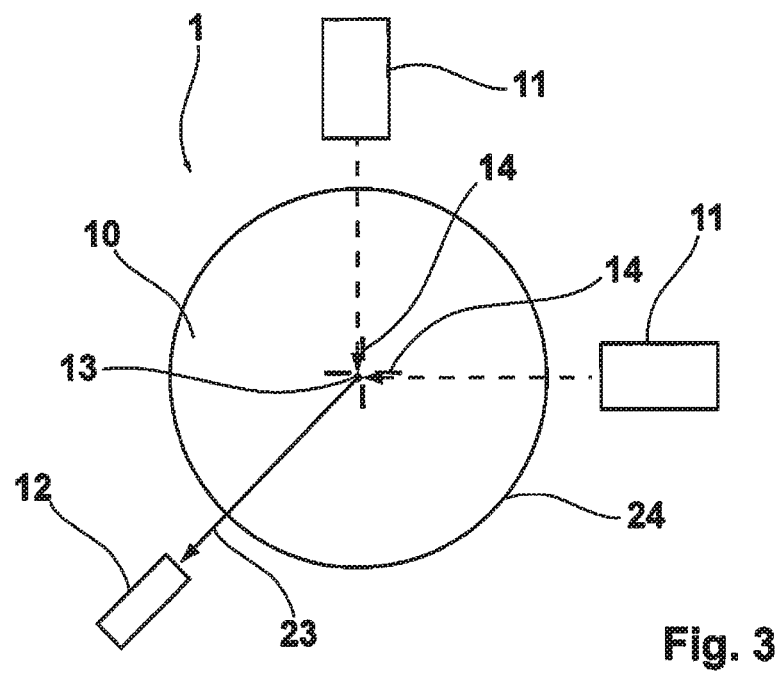
FIG. 3 shows a schematic view of the pipe section with two light sources and a sensor unit for the detection of particles.

FIG. 3 shows a special variant of a flow measurement device 1, the pipe section 24 being illustratively shown in a front view and the fluid 10 flowing through it. The particles 13 are located in the fluid 10, one particle 13 being exemplarily shown. The wall of the pipe section 24 is for example designed to be transparent, in order to illuminate it with light by means of the light sources 11.

The arrangement comprises a first light source 11 and a second light source 11 disposed within the pipe section 24 with an angular offset of 90° around its longitudinal axis. Both light sources 11 thus radiate light into the fluid 10 perpendicularly to each other, thus forming two measurement planes 14, the measurement planes of which are formed perpendicularly relative to each other. The sensor unit 12 is located outside of the pipe section 24 in the angle bisector between the extension direction of the two measurement planes 14, so that the observation directions 23 respectively surround an angle of 135° relative to both light propagation directions of the light sources 11. When the flow measurement unit 1 operates and the light sources 11 correspondingly emit light that is received by the sensor unit 12 as a light scattered by the particle 13, the sensor unit 12 can take measures in both measurement planes 14.

Figure 4:
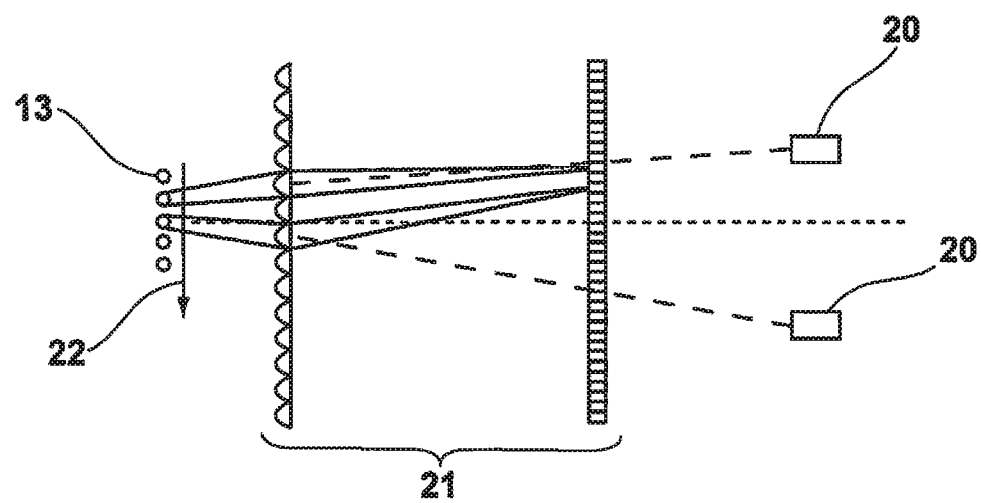
FIG. 4 shows a schematic view of a cylinder lens array line sensor arrangement as well as two photodiodes and FIG. 5 shows a schematic view of a sensor unit designed as a CMOS sensor for observing particles in a fluid.

FIG. 4 exemplarily shows particles 13 that move in the direction of flow 22. With a light source, that is not shown in detail here, a scattered light is generated, which first passes through a cylinder lens array line sensor arrangement 21, wherein the movement of the particles 13 can be detected by means of the line sensors of the line sensor arrangement. Alternately, photodiodes 20 can be used, which are also shown in FIG. 4 in a simplified manner. The scattered light alternatingly reaches the shown photodiodes 20 in particular through the cylinder lens array, so that a movement of the particles 13 can also be detected thereby.

Figure 5:
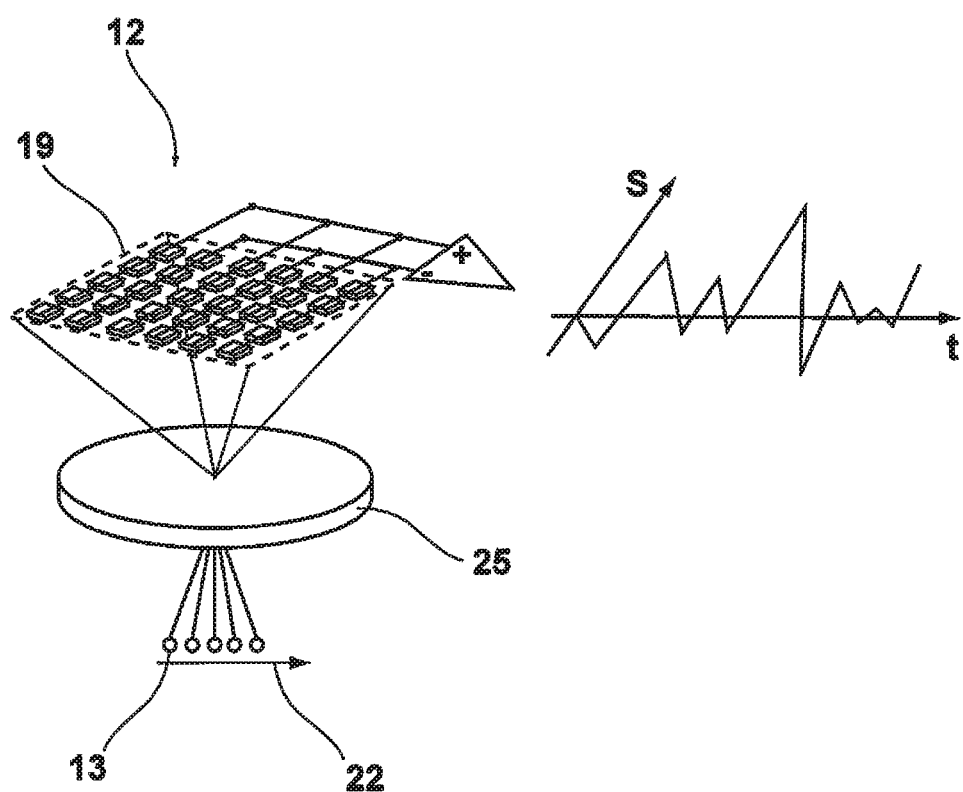

FIG. 5 shows a sensor unit 12 that is exemplarily designed as a CMOS sensor 19. When the exemplarily shown particles 13 move under a lens 25, the individual pixels of the CMOS sensor 19 are successively illuminated by means of a light source (not shown) and scattered light formed at the particles 13, so that a signal S having a wavelength is generated over a period t by the reflected scattered light and the illumination of the CMOS sensor 19. The more particles 13 are contained in the fluid, the greater the amplitude of the signal S becomes, so that a movement speed and a movement direction of the particle 13 can be detected over the period t. Because the CMOS sensors 19 are two-dimensional, a movement of the particles 13 in the fluid can be detected both in the direction of flow and transversely to the direction of flow, which can then be reconstructed with the FPGA 15 (see FIG. 1) into a completely reconstructed digitally provided flow profile.

The invention is not limited in its implementation to the afore-mentioned preferred exemplary embodiment. Rather, a number of variants are conceivable, which also make use of the shown solution even with fundamentally different embodiments. All the features and/or advantages, including constructional details or spatial arrangements, arising from the claims, the description or the drawings, can be essential to the invention both as such and in any combination of each other.

LIST OF REFERENCE NUMERALS

1 Flow measurement device
10 Fluid
11 Light source
12 Sensor unit
13 Particle
14 Measurement plane
15 Field programmable gate array
16 Computing unit
17 Output module
18 Output signal
19 CMOS sensor
20 Photodiode
21 Cylinder lens array line sensor arrangement
22 Direction of flow
23 Direction of observation
24 Pipe section
25 Lens
S Sensor signal
t Time

The invention claimed is:

1. A flow measurement method for optical measurement of a volume flow of a fluid in a closed cross-section, comprising:
    illuminating at least one measurement plane and particles present therein with a light source;
    providing a sensor unit having at least two individual detectors operable to output sensor signals;
    detecting particles present in the fluid within the at least one measurement plane using the sensor unit;
    connecting a computing unit downstream of the sensor unit;
    processing the sensor signals with the computing unit in real time by integrating and weighting individual signals of the individual detectors using a spatial-filtering technique, and outputting an output signal;
    inserting a field programmable gate array between the sensor unit and the computing unit, the field programmable gate array being operated with a program configuration;
    generating, by the field programmable gate array, motion vectors of the particles, and thus of the fluid, based on image points and/or image lines captured by the sensor unit based on moved ones of the particles;
    connecting an output module downstream of the computing unit;
    outputting the motion vectors of the particles, and thus of the fluid, from the computing unit to the output module; and
    outputting from the output module a flow velocity of the fluid as an output signal based on the motion vectors of the particles.

2. The flow measurement method according to one of the claim 1, wherein the sensor unit comprises at least one CMOS sensor and/or one CCD sensor and/or an arrangement of photodiodes.

3. The flow measurement method according to claim 1, wherein:
    the sensor unit comprises a first sensor unit associated with a first measurement plane of the at least one measurement planes;
    further comprising a second sensor unit associated with a second measurement plane of the at least one measurement planes;
    the at least two measurement planes being successively formed in the direction of flow of the fluid.

4. The flow measurement method according to claim 3, wherein a direction of observation of at least one of the sensor units is arranged with an angular offset relative to an emission direction of a light of a light source.

5. The flow measurement method claim 1, wherein the sensor until is only one sensor unit and the at least one measurement plane comprises at least two measurement planes having a common intersection line or being arranged in succession in the direction of flow;

further comprising providing at least two light sources disposed relative to each other and to the sensor unit in such a manner that the at least two measurement planes are created and captured by the only one sensor unit.

6. The flow measurement method according to claim 1, wherein the at least one measurement plane comprises two measurement planes, which are oriented parallel to one another, perpendicularly to one another or with an angular offset of 60° to 180° relative to each other.

7. The flow measurement method according to claim 1, wherein the at least one measurement plane comprises two measurement planes, which are oriented with an angular offset of 90° relative to each other.

8. The flow measurement method according to claim 1, wherein the light source emits continuous or pulsed light and/or emits light with different wavelengths.

9. A flow measurement device for optical measurement of a volume flow of a fluid in a closed cross-section, comprising:

a pipe section through which a fluid can flow, at least one measurement plane defined in the pipe section;

at least one light source operable to radiate light into the pipe section and to illuminate particles present in the fluid in the at least one measurement plane;

at least one sensor unit operable to capture the particles present in the fluid within the at least one measurement plane, the sensor unit comprising at least two or a plurality of individual detectors with which sensor signals can be outputted;

a computing unit connected downstream of the sensor unit, the computing unit operable to process the sensor signals in real time by integrating and weighting of individual sensor signals of the individual detectors using a spatial-filtering technique and to output the processed signals as an output signal;

a field programmable gate array arranged between the sensor unit and the computing unit, the field programmable gate array being operated with a program configuration, the field programmable gate array generating motion vectors of the particles, and thus of the fluid, based on image points and/or image lines captured by the sensor unit based on moved ones of the particles; and an output module downstream of the computing unit for outputting the motion vectors of the particles, and thus of the fluid, from the computing unit to the output module and for outputting from the output module a flow velocity of the fluid as an output signal based on the motion vectors of the particles.

* * * * *